(12) United States Patent
Shi et al.

(10) Patent No.: US 8,726,384 B2
(45) Date of Patent: May 13, 2014

(54) APPARATUS, AND SYSTEM FOR DETERMINING AND CAUTIONING USERS OF INTERNET CONNECTED CLIENTS OF POTENTIALLY MALICIOUS SOFTWARE AND METHOD FOR OPERATING SUCH

(75) Inventors: Fleming Shi, Cupertino, CA (US); Dean Drako, Los Altos, CA (US)

(73) Assignee: Barracuda Networks, Inc., Campbell, CA (US)

( * ) Notice: Subject to any disclaimer, the term of this patent is extended or adjusted under 35 U.S.C. 154(b) by 223 days.

(21) Appl. No.: 13/091,293

(22) Filed: Apr. 21, 2011

(65) Prior Publication Data
US 2012/0272319 A1    Oct. 25, 2012

(51) Int. Cl.
*H04L 29/06* (2006.01)
(52) U.S. Cl.
USPC ............ 726/23; 726/1; 726/3; 726/24; 713/1; 713/153; 709/224
(58) Field of Classification Search
USPC .................................................... 726/23–24
See application file for complete search history.

(56) References Cited

U.S. PATENT DOCUMENTS

| | | | | |
|---|---|---|---|---|
| 7,571,485 | B1 * | 8/2009 | McCorkendale et al. | 726/26 |
| 7,694,115 | B1 * | 4/2010 | Porras et al. | 713/1 |
| 7,712,134 | B1 * | 5/2010 | Nucci et al. | 726/23 |
| 8,117,655 | B2 * | 2/2012 | Spielman | 726/22 |
| 8,214,907 | B1 * | 7/2012 | Sobel et al. | 726/25 |
| 2005/0010753 | A1 * | 1/2005 | Marceau et al. | 713/153 |
| 2007/0157306 | A1 * | 7/2007 | Elrod et al. | 726/14 |
| 2007/0204341 | A1 * | 8/2007 | Rand et al. | 726/22 |
| 2008/0005782 | A1 * | 1/2008 | Aziz | 726/3 |
| 2010/0095377 | A1 * | 4/2010 | Krywaniuk | 726/22 |
| 2011/0321160 | A1 * | 12/2011 | Mohandas et al. | 726/22 |
| 2012/0102568 | A1 * | 4/2012 | Tarbotton et al. | 726/23 |

* cited by examiner

*Primary Examiner* — Morshed Mehedi
(74) *Attorney, Agent, or Firm* — Duane Morris LLP (57) ABSTRACT

A system at a central server and at a plurality of web filters is installed to observe traffic and to protect users from attempting connection to suspicious, malicious, and/or infectious targets. Targets are defined as Uniform Resource Identifiers (URI) and Internet Protocol (IP) addresses. Traffic is collected, analyzed, and reported for further analysis. Behavior is analyzed for each client attempting a connection to an uncategorized target. IP addresses and URIs are evaluated toward placement in either a Trusted target store or an Anomalous target store. The accumulated content of Anomalous target store is provided back to the Network Service Subscriber Clients. Warnings and tools are presented when appropriate.

3 Claims, 10 Drawing Sheets

APPARATUS, AND SYSTEM FOR DETERMINING AND CAUTIONING USERS OF INTERNET CONNECTED CLIENTS OF POTENTIALLY MALICIOUS SOFTWARE AND METHOD FOR OPERATING SUCH

RELATED APPLICATIONS

None.

BACKGROUND

In the process of categorizing new targets identified by web filters, the Applicants observed that some targets were not resolvable to actual hosts or to actual IP addresses, ie. the targets were bogus or invalid. In the process of categorizing new targets identified by web filters, the Applicants observed a frequency or volume of requests concentrated to yet uncategorized targets that far exceeded normal human rates of Internet traffic from a singular source. In the process of categorizing new targets identified by web filters, the Applicants observed that the traffic patterns alone suggested that the source of the traffic was infected with a robot or conducting malicious behavior.

Close observation of Internet traffic has revealed concentrated spikes of electronic packets transmission to and requests from obscure and mysterious targets. What is needed is a way to systematically collect, analyze, and inform users of hazards and potential infection based on traffic emanating from a client.

BRIEF DESCRIPTION OF FIGURES

The appended claims set forth the features of the invention with particularity. The invention, together with its advantages, may be best understood from the following detailed description taken in conjunction with the accompanying drawings of which:

SUMMARY OF THE INVENTION

Traffic from a plurality of Network Service Subscriber Clients is collected, analyzed, and reported for further analysis. Client behavior is analyzed for each uncategorized target IP address or Uniform Resource Identifier (URI) host using detailed rules. Based on client behavior, each target is assigned to either a Trusted target store or an Anomalous target store. Access to the accumulated Anomalous target store and related caveats are provided back to the Network Service Subscribers for delivery or display to the users of the clients originating the traffic.

It is understood among those skilled in the art that the central server may not be a separate physical server and may not only share hardware resources but also share software with a web hosting server. It is described separately solely for clarity of understanding.

DETAILED DISCLOSURE OF EMBODIMENTS OF THE INVENTION

For use within this patent application we define targets to be Internet Protocol addresses or Uniform Resource Identifiers of real or fictitious hosts. Such a host may be an innocent victim, may contain malicious code, or may be entirely fraudulent and non-existent.

Figure 1A:
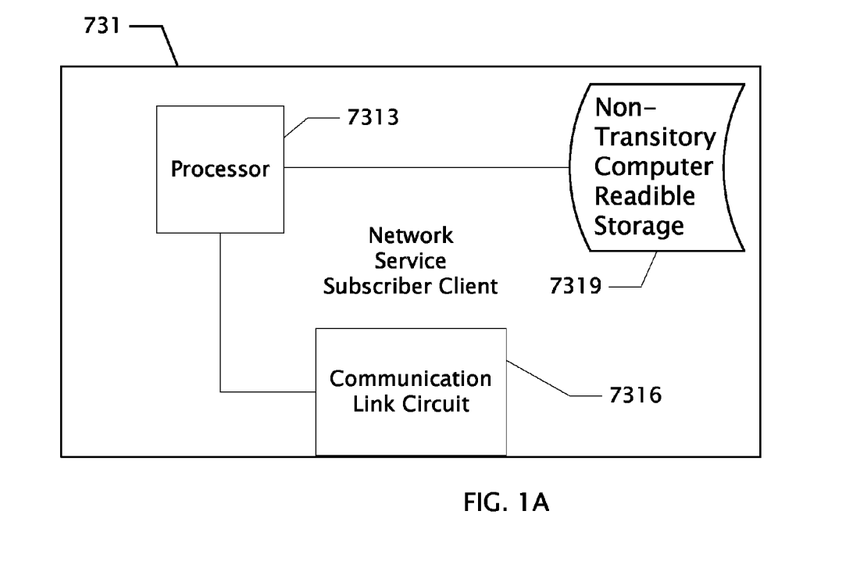
FIGS. 1A and 1B are schematic drawings of apparatus configured by software to perform the method steps of the invention.
Figure 1B:
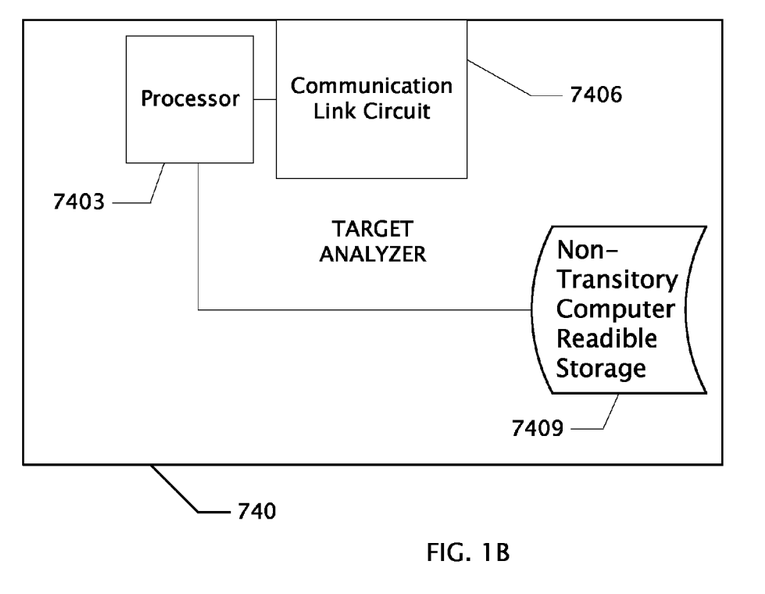

Referring to FIGS. 1A and 1B, both a Network Service Subscriber Client 731 and a target analyzer 740 are apparatus comprising a processor (7313, 7403) coupled to a communication link (7316, 7406) further communicatively coupled through the Internet to a plurality of hosts, domain name system servers, and to each other. Each processor is further coupled to non-transitory computer readable storage (7319, 7409) for both data and for computer-executable instructions for configuring the processor to perform method steps as disclosed later in this patent application.

Figure 2:
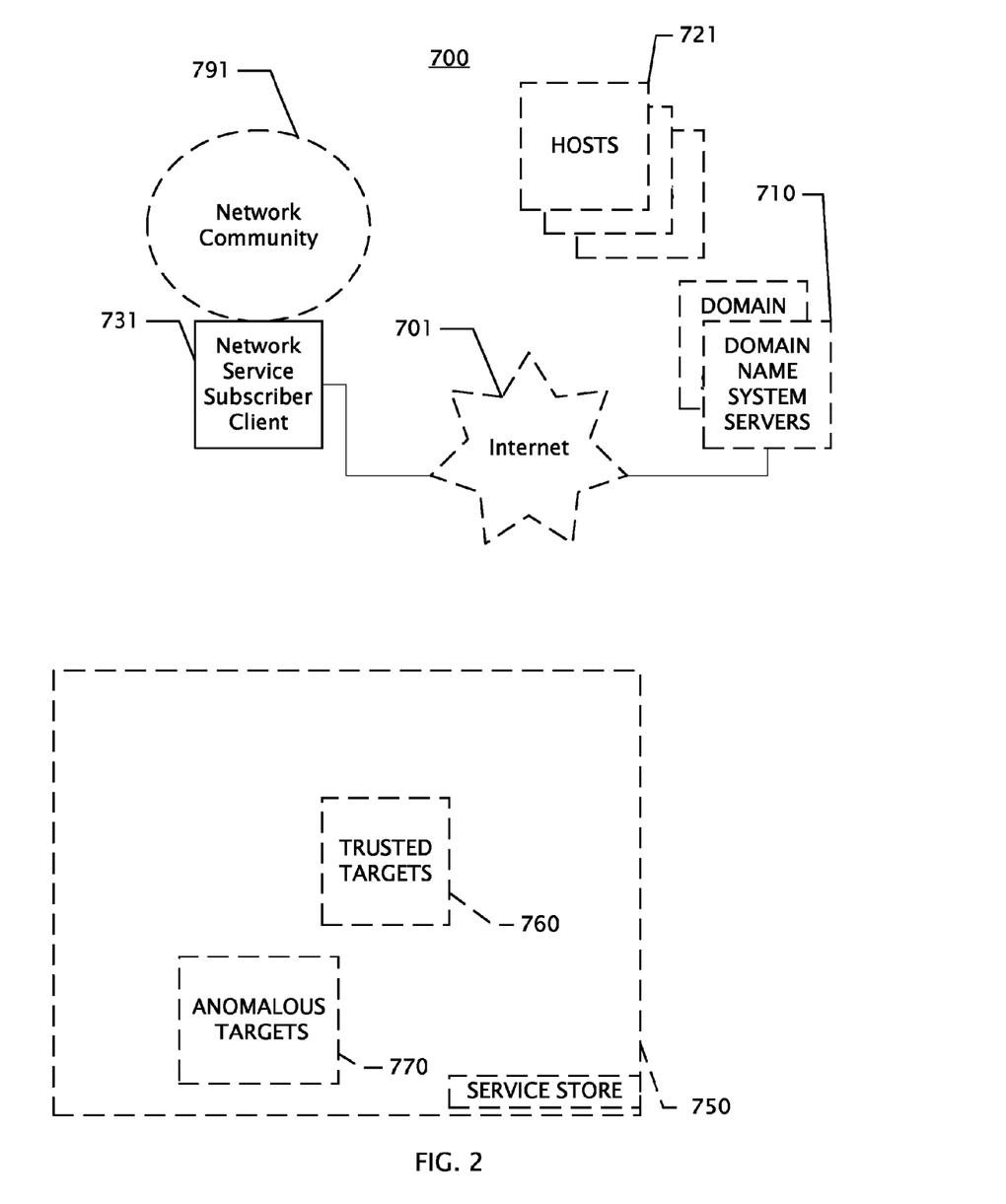
FIGS. 2-7 are system diagrams of embodiments of the invention coupled through the Internet and to targets and domain name system servers pertinent to full understanding of the invention.

Referring to FIG. 2, in an embodiment, a Network Service Subscriber Client 731, communicatively coupled to the Internet 701, initiates an Internet Protocol session by requesting an IP address from one or more Domain Name System servers 710. If the domain name fails to resolve, the Network Service Subscriber Client stores that meta data. If the DNS server provides an IP address, the Networks Service Subscriber Client proceeds with the session. It is the observation of the Inventors that there is great similarity in user preferences across the Internet, allowing for regional preferences or enterprise and professional utilization. But relatively high traffic to a target not known by many other users connotes a potential problem.

Figure 3:
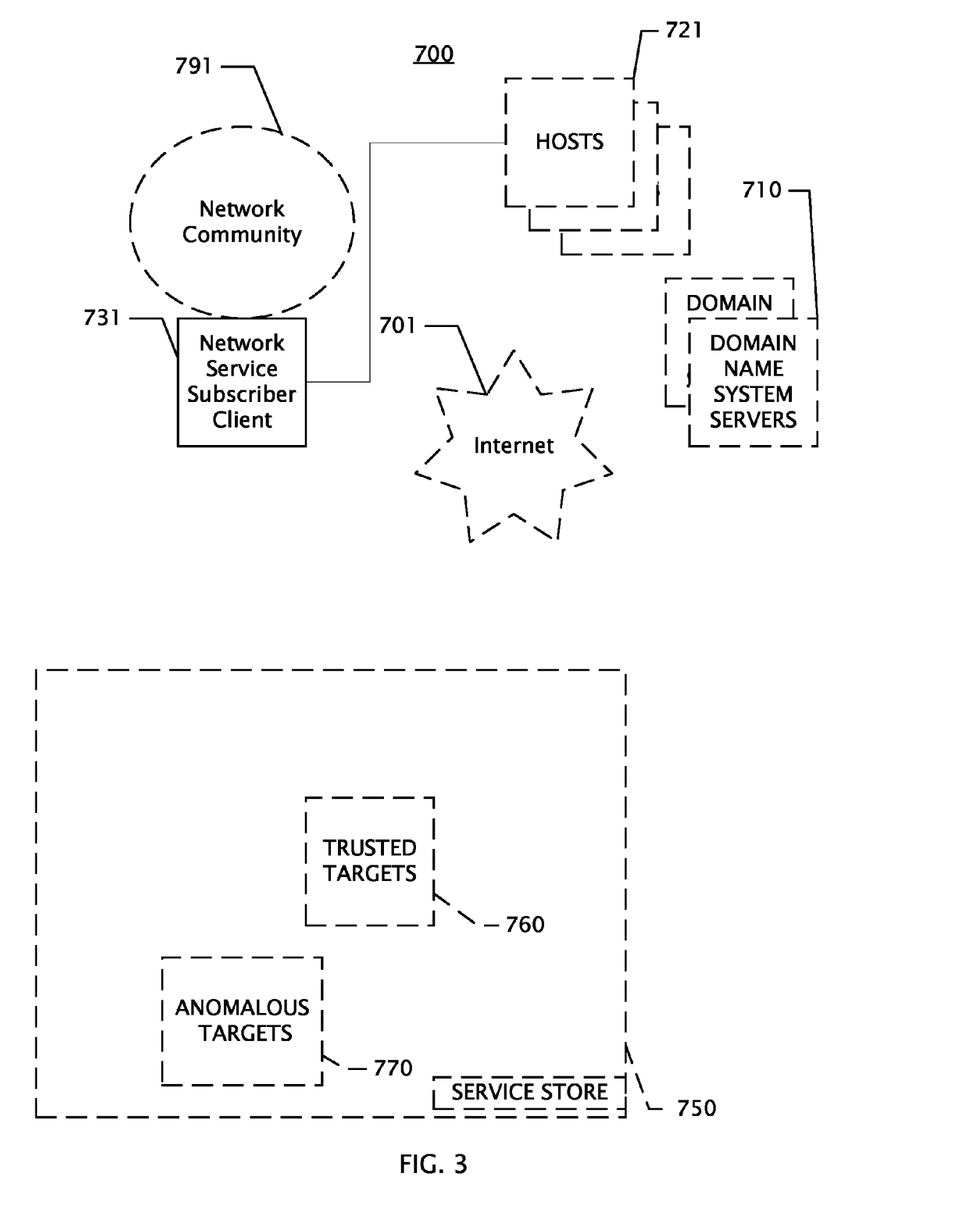

Referring to FIG. 3, when the Networks Service Subscriber Client 731 has a target's IP address, he attempts to initiate a session via the Internet 701 with a Host 721. If the session fails to connect or is refused or is otherwise not successful, the Network Service Subscriber Client stores that meta data. The number of times and the rate at which the Network Service Subscriber Client is unsuccessful at connecting to a target is stored. It is the observation of the Inventors that providing a fictitious IP address connotes an attempt to exploit a weakness in Internet security.

Figure 4:
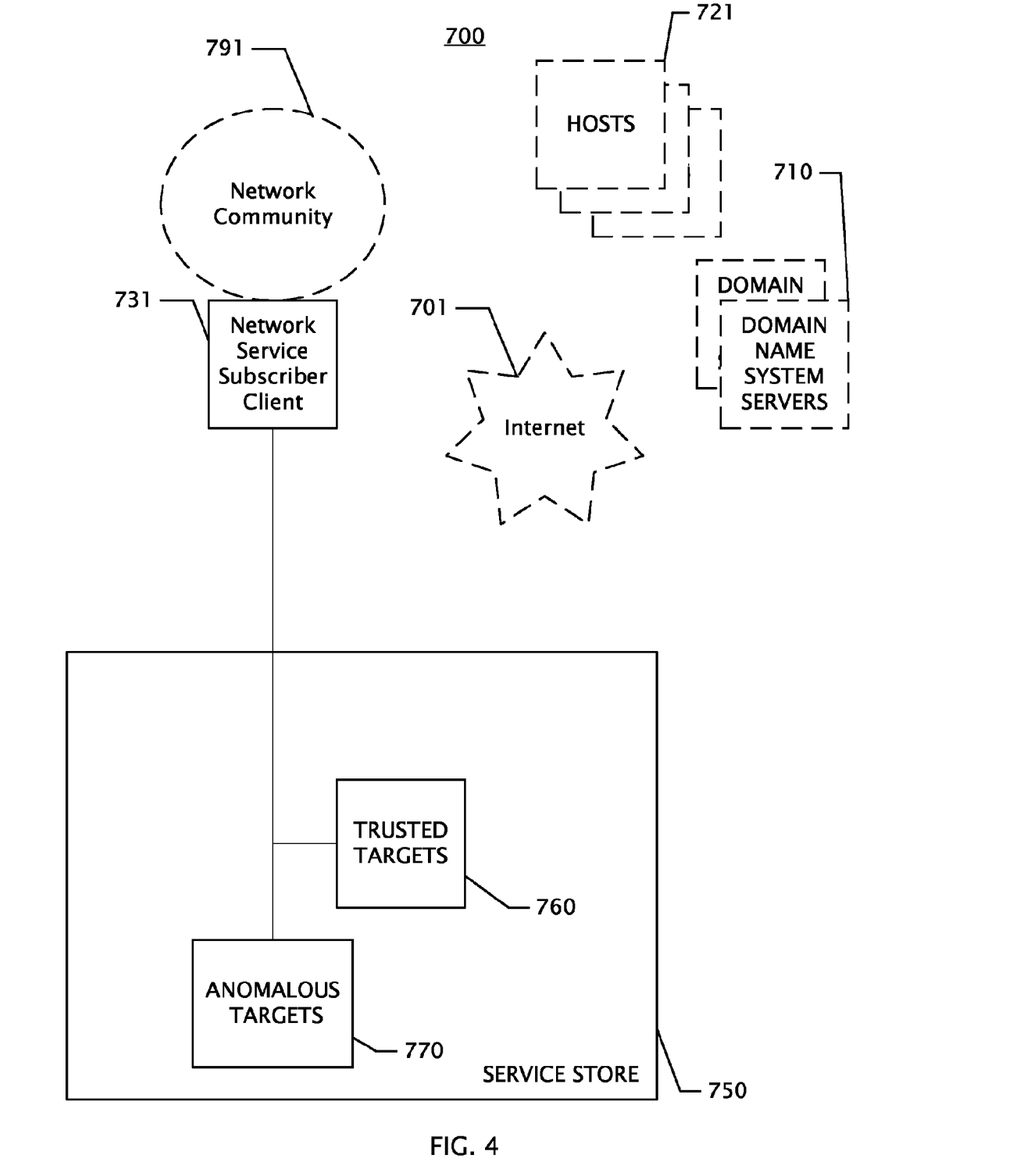

Referring now to FIG. 4, in an embodiment, a Network Service Subscriber Client 731 communicatively coupled through the Internet 701 to a plurality of Domain Name System Servers 710 and coupled to a plurality of Hosts 721, is further coupled to a Service Store 750. Said Service Store comprises a Trusted target store 760 communicatively coupled to the Internet and an Anomalous target store 770 communicatively coupled to the Internet. In an embodiment, the Network Service Subscriber Client reads from the Trusted target store, compares targets he has observed, and uploads some or all of the observed targets which are not (yet) in the Trusted target store to the Anomalous target store. In an embodiment, it may only select the top traffic targets that are uploaded. In an embodiment, it may select the targets that have actively greater than a statistical measure of all traffic observed by the Network Service Subscriber Client. In an embodiment, the Network Service Subscriber Client may have a previously obtained copy of the Trusted target store and only check for targets that are newly observed. It is not particularly useful to check targets that may be only occasionally requested such as a misspelling of a Trusted target. It is however useful to detect if activity and traffic is inconsistent with a human reaction time and matches the performance of a daemon or software agent controlling a processor. The Network Service Subscriber Client, an apparatus controlling a processor configured by rules, not a person, may record requests and the rate at which requests are made and apply thresholds or logic to determine if a target is anomalous or simply unpopular.

In an embodiment, the Network Service Subscriber Client anonymizes its own identity and submits targets for incorporation into either the trusted or anomalous stores untraceably. In an embodiment the Network Service Subscriber Client may filter and select only those anomalous targets which are pertinent to his or her identity. In an embodiment, a plurality of Network Service Subscribers Clients provide information about targets with high activity and in return receive forewarning of Anomalous targets which they have not yet encountered. In an embodiment, the Anomalous target store is accessible to all participants coupled to the Internet without regard to whether they are Network Service Subscriber Clients.

Figure 5:
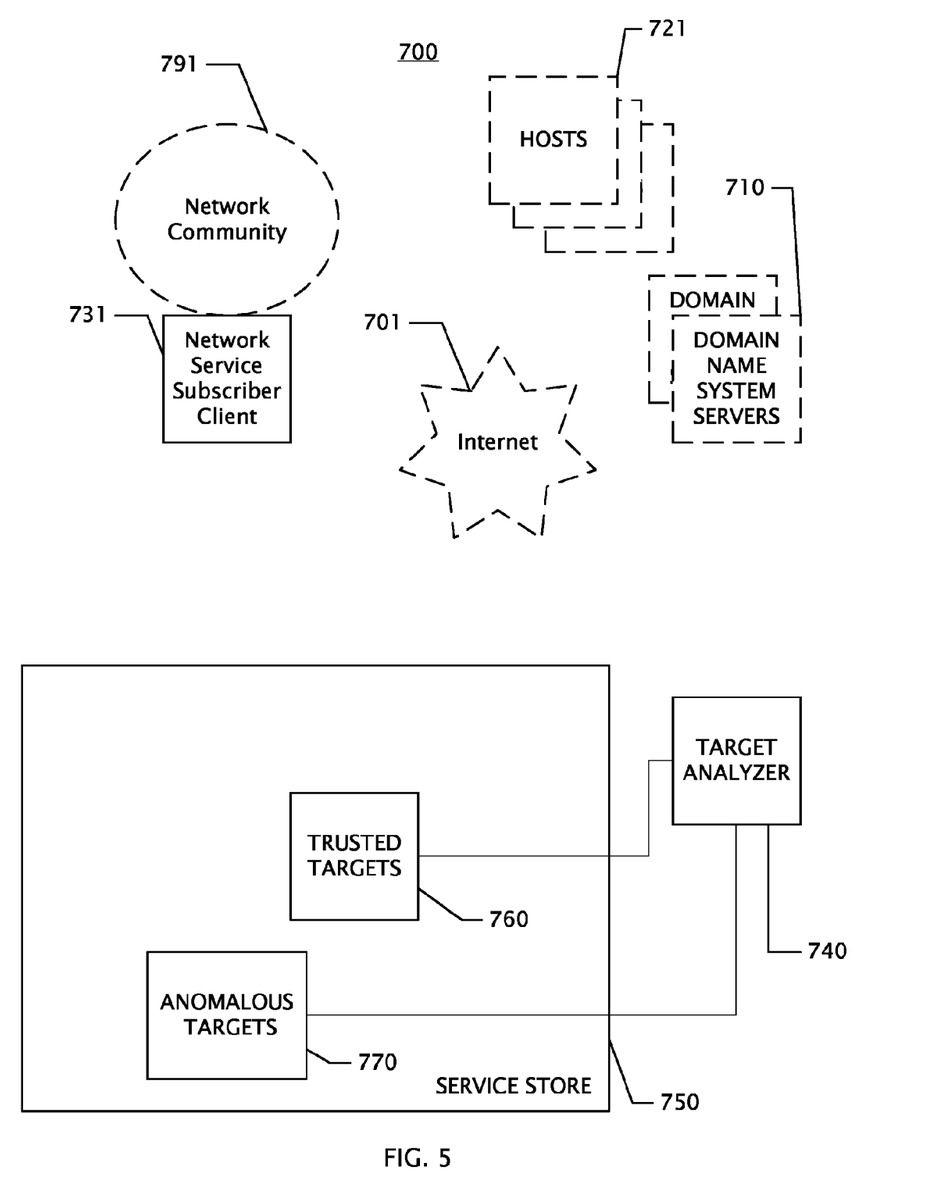

Referring now to FIG. 5, in an embodiment, the system further includes a target Analyzer circuit 740 which reads from the Anomalous target store 770 and applies rules and tests which will be more fully detailed below. As a result of applying the rules and tests, an Anomalous target may be entered into the Trusted target store 760, or remain in the Anomalous target store with a Caveat. The Caveats may have different levels of recommended action or information depending on the success of the target Analyzer to categorize the content.

Figure 6:
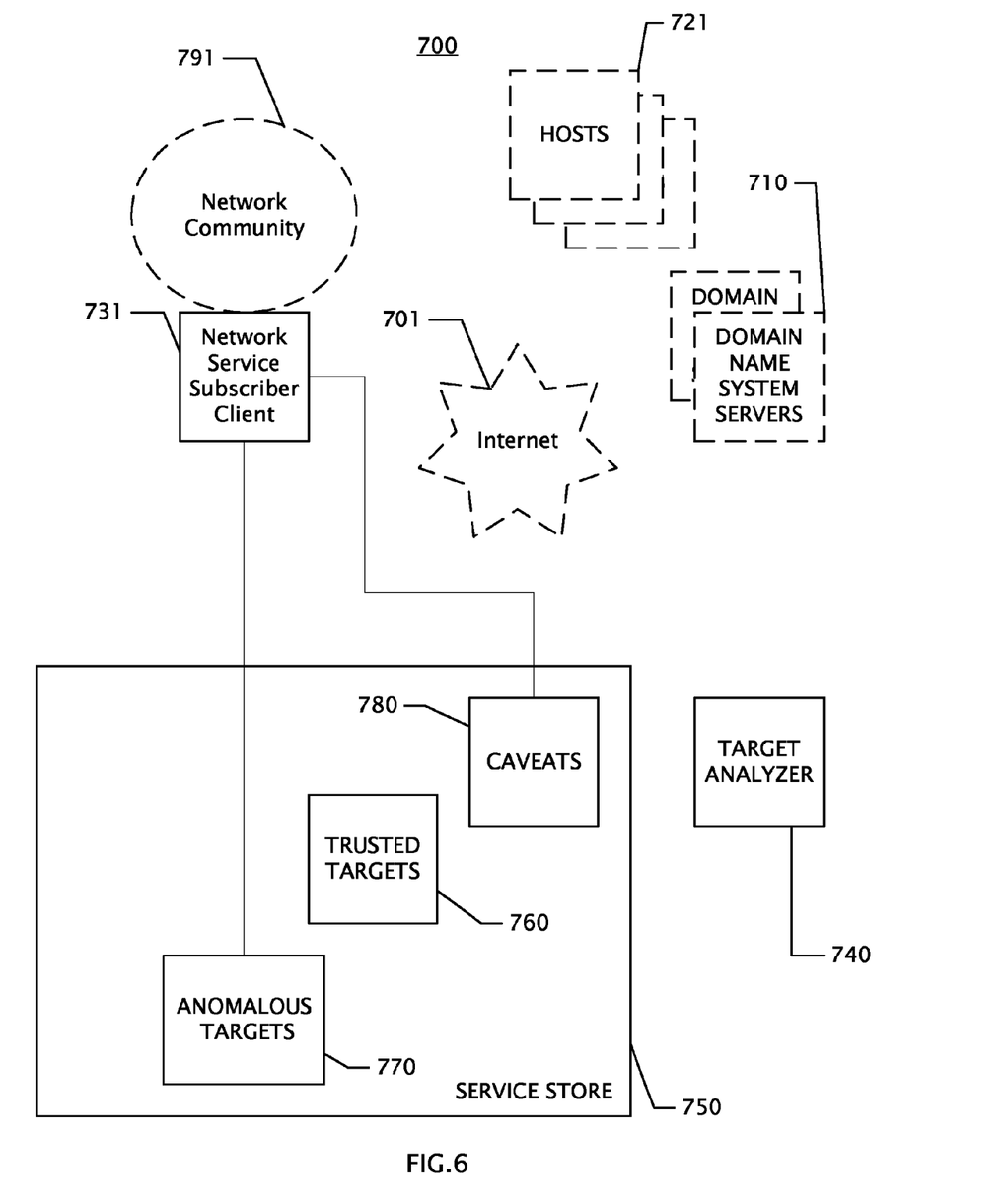

Referring now to FIG. 6, in an embodiment, the system further includes a Caveat store 780. In an embodiment, each Caveat has its own URI or IP address which may display text or images specific to the type of threat or category of content which is determined by the target Analyzer 740. A Network Service Subscriber Client 731 which requests a target in the Anomalous target store 770 is redirected to a corresponding Caveat in the Caveat store 780. Many Anomalous targets may appropriately be categorized to receive the same Caveat and the separation of the Caveat from the Anomalous target store may be more efficient.

Figure 7:
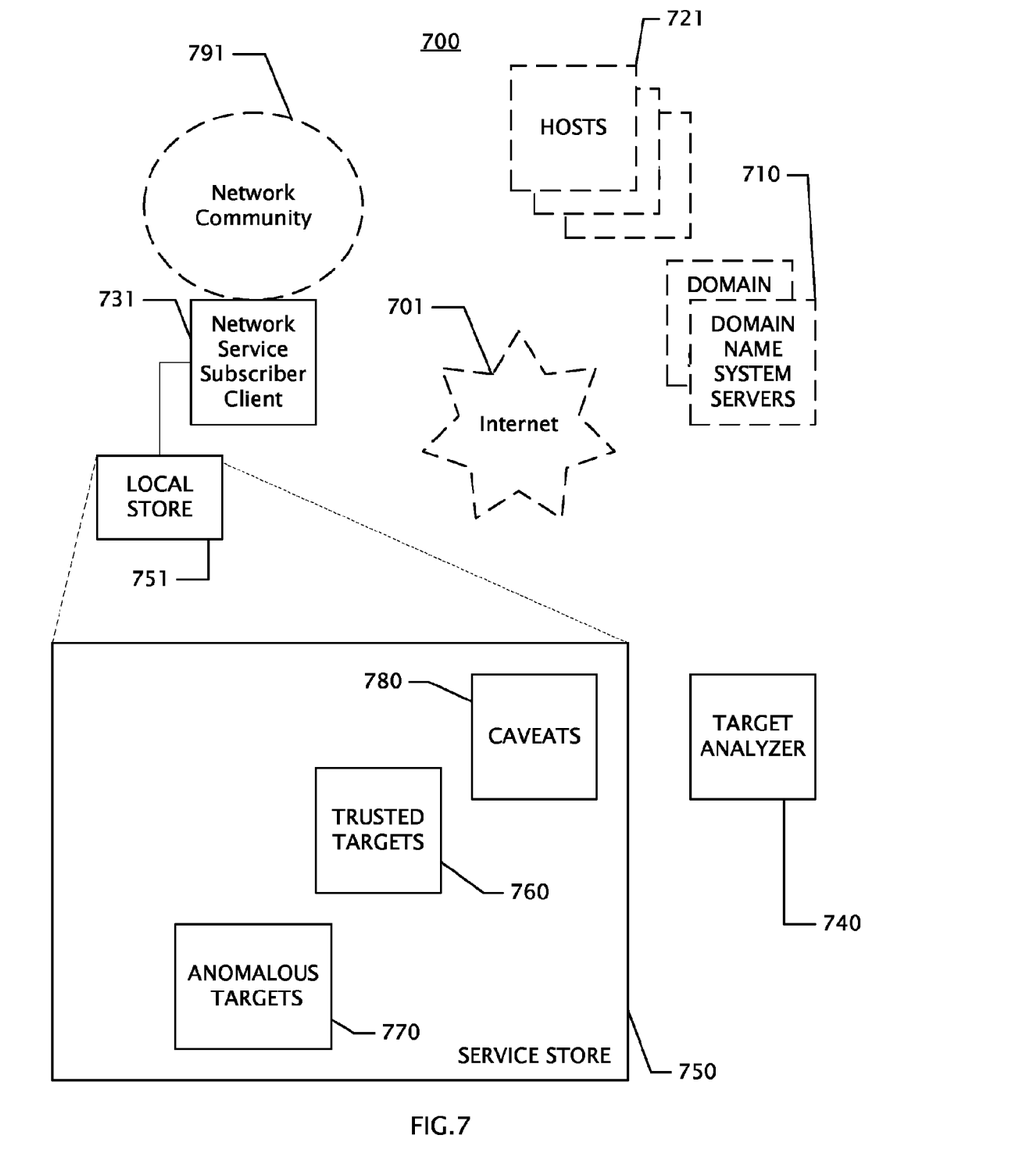

Referring now to FIG. 7, in an embodiment, the system further includes a local store 751 which is communicatively coupled to the Network Service Subscriber Client 731. This local store can be updated on schedule or on demand from the Service Store 750. The local store may include, for performance reasons, one or more copies of the following Anomalous target store 770 Trusted target store 760, and Caveats store 780. The Anomalous target store may be tailored to only contain the Anomalous targets previously encountered by the specific Networks Service Subscriber Client 731 or previously encountered by the Network Community Client 791 which operatively connects to the Internet 701 by means of the Network Service Subscriber Client. The Caveats store may contain text and images which will be transmitted to a client which requests an anomalous target or simply a link to a message server which transmits a caveat to said client instead of attempting a connection to a target 721. In this way, a client within the Network Community who is anonymised by Network Address Translation (NAT) will receive a Caveat whenever some access is being attempted from that specific machine even though externally the identity of the Client is hidden by Network Address Translation.

Figure 8:
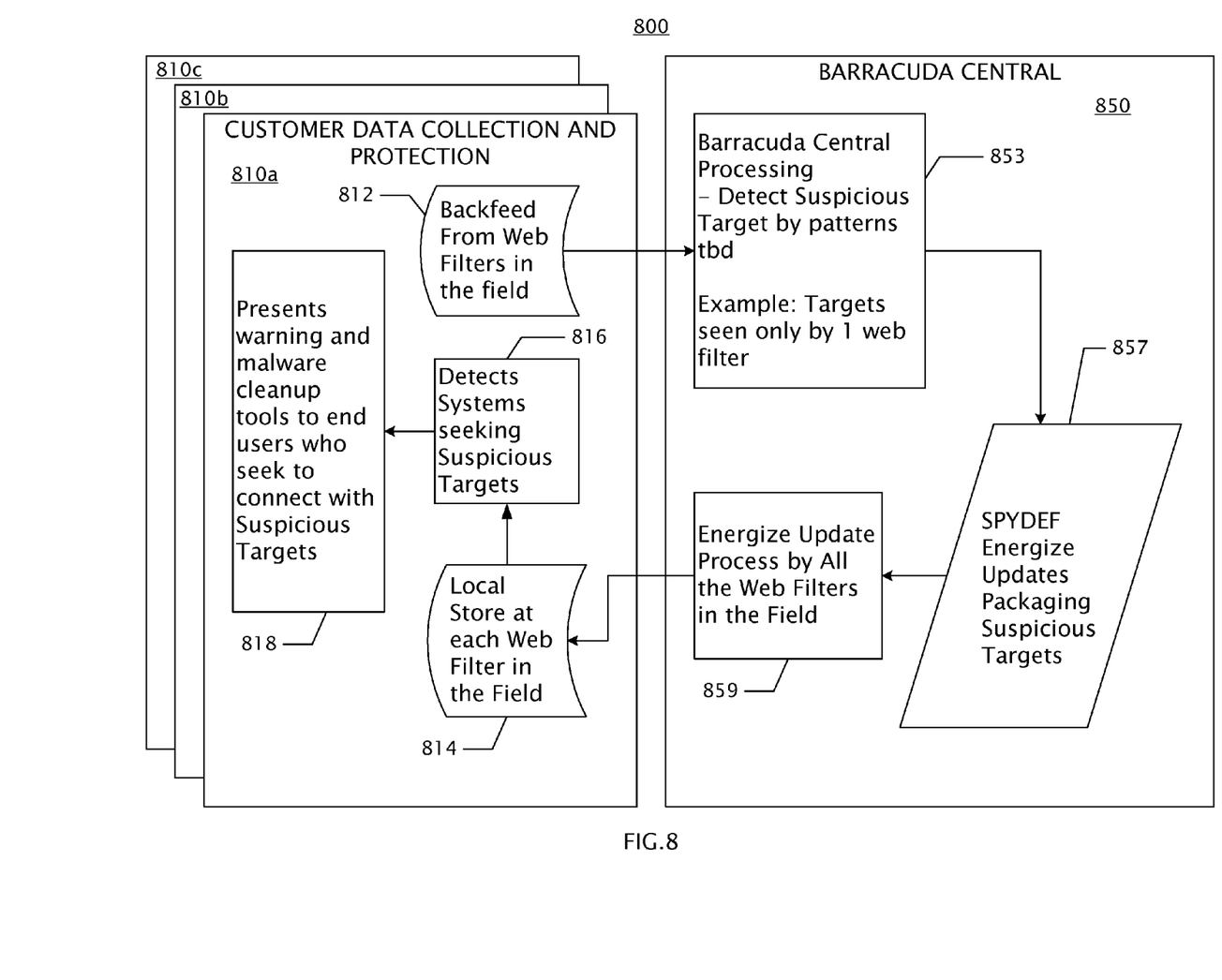
FIG. 8 is a system diagram showing interactions among the components of an embodiment.

Referring now to FIG. 8 an embodiment of a system for warning users of suspicious targets. The system comprises a central server apparatus 850, in an embodiment Barracuda Central, communicatively coupled in an embodiment through a communications system commonly called the Internet, to a plurality of Customer Data Collection and Protection local network Web Filter apparatuses 810a. (810b and 810c are suggested but not explicitly shown as partially hidden behind 810a.) Each Web Filter effectively operates at the edge of the local network whereby all communication across the boundary to the Internet can be observed and possibly disposed. Each Webfilter has a observation and backfeed circuit 812. When the observation and backfeed circuit 812 observes traffic from within its local network attempting connection to a hitherto uncategorized target, the identification and volume of traffic is recorded and reported to the central server apparatus 850. An other element of the Webfilter is a local store 814 which is communicatively coupled through the Internet to an update circuit 859, in an embodiment an Energize Update Process.

While conventional Web Filters subscribe to white lists and black lists or block lists which depend on external imposition of values and analysis of the content provided at a host, the present webfilter receives a single Categorized list which allows local control by each Customer Data Collection and Protection local network administrator. Websites categorized as financial, food, sex, or surgery may have controlled accessibility according to local administrators. The present invention accumulates at each Web Filter, unusual traffic (e.g. beyond some threshold) that attempts connection to target ie. an Internet Protocol (IP) address or Uniform Resource Identifier (URI) which is heretofore uncategorized. A Backfeed circuit 812 in each instance of Web Filter 810 (810a, 810b, 810c . . . ) forwards a report on traffic or attempted connections to targets not known to a currently updated directory of categorized targets. Said currently updated directory of categorized targets resides in a computer readable non-transitory local store 814. In an embodiment, the web filter initiates each update by opening a secure channel. In an embodiment, the web filter receives an authenticated or encoded transmission. In an embodiment, the web filter receives a notification and generates a key pair to request and retrieve each update. Within a detection circuit 816, the Web Filter examines traffic that attempts to connect to external servers. This includes DNS requests for an IP address of a target as well as other TCP/IP protocols which can use either an IP address or a URI.

Traffic that attempts to connect to certain targets may be identified as initiated by malware which has infected a client of the local area network. A warning may be transmitted to the operator of such a client. Clean up tools or a clean up process may be initiated on such a client. A network request from a client to target (an IP address or URI) which is identified as suspicious or infectious is redirected to a repository 818 of warnings and cleanup tools. In an embodiment, a link on a webpage which directs to an advertisement containing a malicious javascript is redirected to a warning or correction site which can initiate or invite the user to initiate an anti-virus or anti-malware scan.

A central server 850, in an embodiment provisioned at Barracuda Central, is communicatively coupled to a plurality of remotely located and customer owned data collection and protection Web Filters which observe and report on traffic between the local area network and the Internet. The central server comprises a receiving circuit 853 which receives reports on traffic from each of the Web Filters. Applying rules or patterns to the traffic may determine that the traffic is suspicious. Examples of such rules and patterns are discussed below but new rules and patterns will continue to emerge.

Legitimate, non-malicious new sites are always being categorized and added to the directory of categorized sites. In the case of malicious or suspicious sites however, warnings and corrective tools are further indicated and included in a repository 857, in an embodiment SPYDEF. The central server 850 further comprises an update circuit 859 that replicates SPYDEF at all the Web Filters in the Field. Unlike categorization which relates to the content of websites, SPYDEF reflects client behaviors such concentrated volume of traffic to targets.

Figure 9:
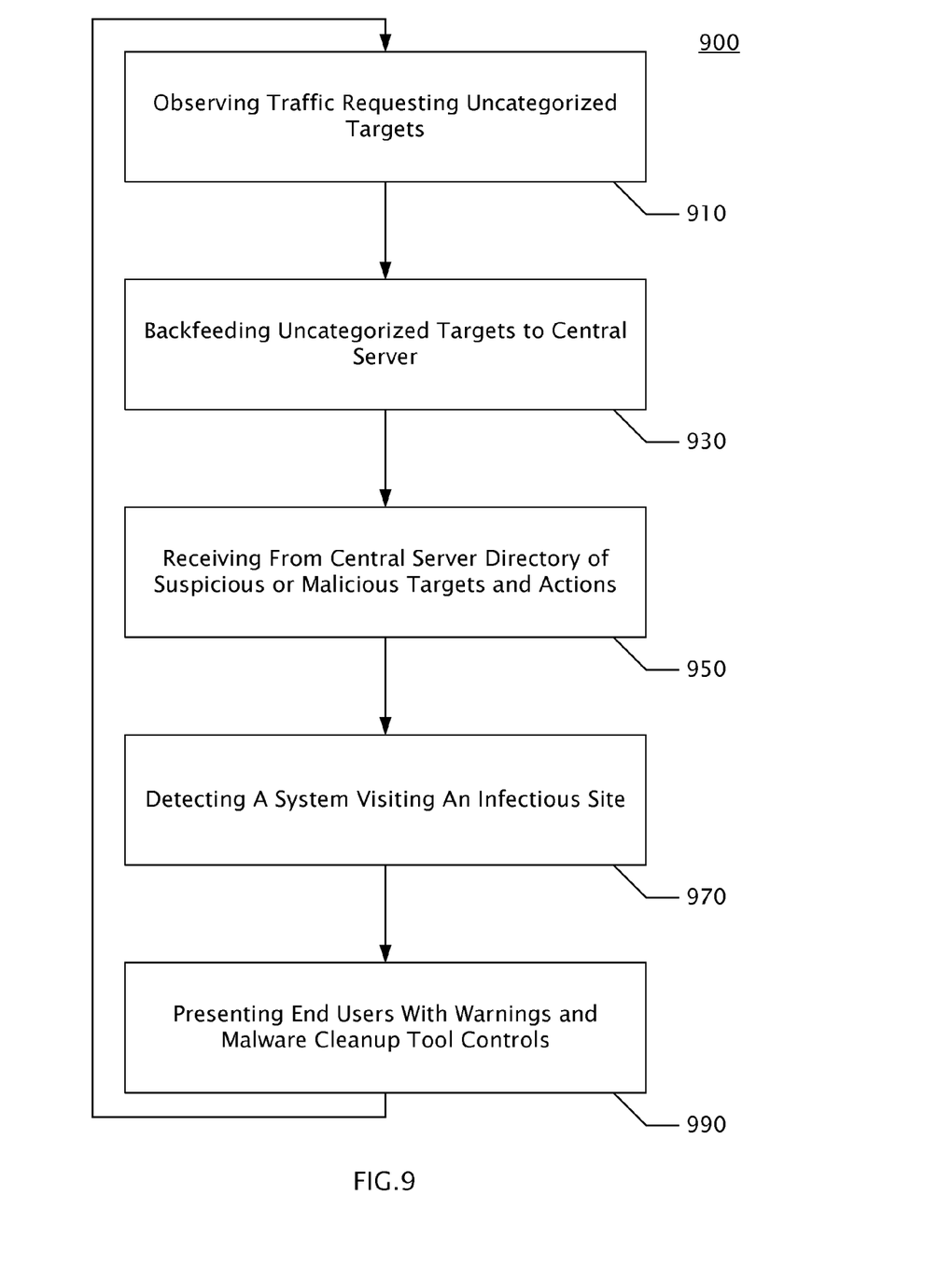
FIGS. 9 and 10 are flow charts of embodiments of the method.
Figure 10:
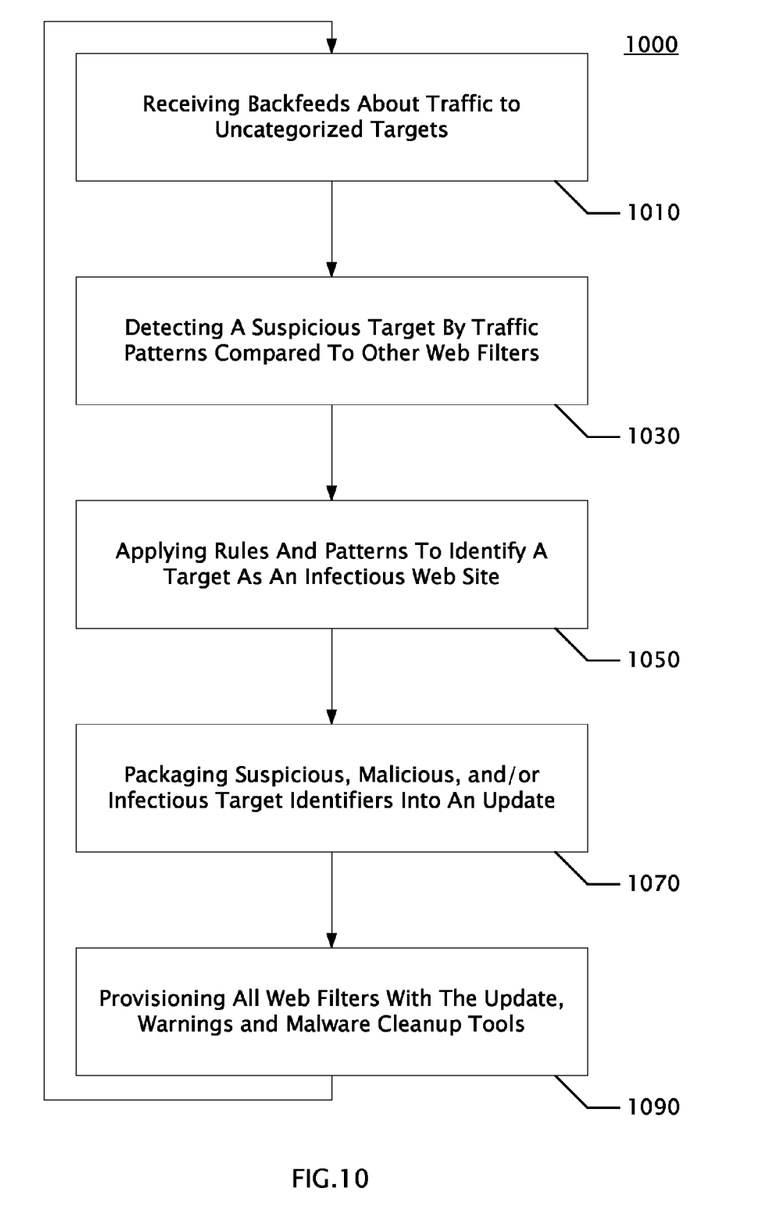

Referring now to FIGS. 9 and 10, a process control chart discloses method steps.

FIG. 9 discloses one embodiment of the operation of a customer data collection and protection apparatus. In one embodiment, the method 900 for operating a web filter for customer data collection and protection which has a processor configured by a software product comprises at least two of the following steps:

transmitting backfeeds 930 to a central server about traffic to or attempts to connect with uncategorized targets;

receiving a directory 950 from the central server containing at least one identifier of at least one suspicious, malicious, or infectious target and appropriate actions; and presenting end users 990 with at least one warning of possible infection, malicious code, or suspicious behavior and controls for a malware cleanup tool.

In an embodiment the method 900 further comprises the step:

detecting a system 970 visiting or attempting to connect to at least one suspicious, malicious, and/or infectious target based on identifiers received from the central server.

In an embodiment the method 900 further comprises the step:

observing, measuring, and recording meta data on traffic 910 at a web filter which requests for an IP address or attempts to connect to an uncategorized destination target. The meta data includes how many sources per destination and the volume of activity per time unit.

FIG. 10 discloses one embodiment of the operation of a central server. In one an embodiment, the method 1000 for operating a central server which has a processor configured by a software product comprises at least two of the following steps:

receiving backfeeds 1010 from a plurality of web filter apparatus about traffic to or attempts to connect with uncategorized targets;

applying rules and patterns 1050 to identify a target as at least one of suspicious, malicious, or infectious; and provisioning a plurality of web filters 1090 with an update having at least one identifier of a suspicious, malicious, or infectious target, a warning, and a malware cleanup tool.

In an embodiment the method 1000 further comprises the step:

packaging identifiers 1070 of a plurality of suspicious, malicious, and/or infectious targets into an update also containing warnings and malware cleanup tools.

In an embodiment the method 1000 further comprises the step:

detecting a suspicious target 1030 by traffic patterns at one web filter compared to traffic patterns at other web filters.

An exemplary traffic pattern of a suspicious target is a target which is only observed at a single web filter.

One method for operating a customer data collection and protection apparatus which has a processor configured by a software product comprises at least two of the following steps:

transmitting backfeeds to a central server about traffic to or attempts to connect with uncategorized targets;

receiving a directory from the central server containing at least one identifier of at least one suspicious, malicious, or infectious target and appropriate actions; and presenting end users with at least one warning of possible infection, malicious code, or suspicious behavior and controls for a malware cleanup tool, wherein a target is one of an IP address and a Uniform Resource Identifier (URI) for a real or fictitious host.

Such an apparatus may also operate to perform one or more of the following steps:

detecting a system visiting or attempting to connect to at least one suspicious, malicious, and/or infectious target based on identifiers received from the central server;

observing, measuring, and recording meta data on traffic at a web filter which requests for an IP address for an uncategorized target or attempts to connect to an uncategorized target, wherein meta data includes how many sources per destination and the volume of activity per time unit.

The invention also provides a method for operation of a central server which has a processor configured by a software product to detect and distribute identifiers of suspicious, infectious, and malicious targets comprises at least two of the following steps:

receiving backfeeds from a plurality of web filter apparatus about traffic to or attempts to connect with uncategorized targets;

applying rules and patterns to identify a target as at least one of suspicious, malicious, or infectious; and provisioning a plurality of web filters with an update having at least one identifier of a suspicious, malicious, or infectious target, a warning, and a malware cleanup tool.

The central server may also operate to perform one of more of the following steps:

packaging identifiers of a plurality of suspicious, malicious, and/or infectious targets into an update also containing warnings and malware cleanup tools; and/or detecting a suspicious target by traffic patterns at one web filter compared to traffic patterns at other web filters.

In an embodiment, an apparatus includes a network link circuit, a processor, data storage device, and non-transitory computer readable media having instructions to configure the processor to observe traffic requesting resolution of an uncategorized URI or having a destination of an uncategorized IP address, and to receive and store an update to a list of uncategorized IP addresses and uncategorized URIs which are observed with traffic that suggests suspicious, malicious or infectious behavior.

The apparatus may further include one or more of the following components coupled to the network link circuit:

a circuit to transmit to a central server a report on traffic patterns to uncategorized targets;

a circuit to detect a dns request to resolve or a transmission to a target on a list of suspicious, malicious, or infectious targets; and a circuit to present users with a warning on the uncategorized status of the target.

A preferred embodiment may utilize an apparatus having a network link circuit, a processor, data storage device, and non-transitory computer readable media having instructions to configure the processor to receive and store a report of an anomalous target and analyze said anomalous target to determine a caveat if appropriate, and in an embodiment:

to distribute a list of anomalous targets and provide a link to a caveat if appropriate, and/or to a store of warnings to be transmitted to a client which requests resolution of or transmission to a target determined to be suspicious, malicious, or infectious.

An other embodiment is an apparatus comprising a network link circuit, a processor, data storage device, and non-transitory computer readable media having instructions to configure the processor
- to receive reports of uncategorized targets and determine when a domain name system request or reverse domain name system request on the target is or is not successful and in an embodiment, which may also comprise one or more of:
- a circuit to detect if malicious code is operating on or is distributed from an uncategorized target, and
- a circuit to detect if a traffic pattern suggests that an uncategorized target is under attack.

Over all, the invention provides a system such as a network, attached computer systems, and software to provision:
- a plurality of customer data collection and protection apparatuses configured to observe requests and traffic having targets which are not categorized targets communicatively coupled to a central server, and
- the central server, configured to receive reports on uncategorized targets, analyze traffic to and concerning said uncategorized targets, and distribute updates to said customer data collection and protection apparatuses.

The customer data collection and protection apparatus comprises:
- a local store of categorized targets, wherein targets comprise actual Internet Protocol address and/or Uniform Resource Identifiers and strings which are formatted as Internet Protocol (IP) addresses and/or Uniform Resource Identifiers (URI); and
- a circuit to report domain name system requests to resolve URI which are not found in the local store of categorized targets and a circuit to report IP application traffic which has as a destination IP addresses which are not found in the local store of categorized targets.

The customer data collection and protection apparatus also may have, in an embodiment:
- a circuit to receive and store an updated list of suspicious, malicious, or infectious targets, and
- a circuit to present a warning to the operator of a client apparatus which has requested from or transmitted to one of the targets on said list.

The central server is made up of:
- a receiver circuit to receive reports on traffic to or requesting resolution of targets not categorized, wherein targets comprise actual Internet Protocol address and/or Uniform Resource Identifiers and strings which are formatted as Internet Protocol (IP) addresses and/or Uniform Resource Identifiers (URI); and
- an analysis circuit to determine that traffic patterns suggest suspicious, malicious, or infectious behavior on the part of a sender.

A preferred central server also has:
- an update packaging circuit to assemble a list of targets which are the subject or destination of traffic patterns which suggest suspicious, malicious, or infectious behavior, and
- an update distribution circuit which transmits to or responds to requests from a plurality of customer data collection and protection apparatuses.

Means, Embodiments, and Structures

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also related to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a non-transitory computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. Within this application, references to a computer readable medium mean any of well-known non-transitory tangible media.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

Conclusion

The present invention is easily distinguished from conventional systems by not depending on the content of targets. The targets may be innocent legitimate websites that are under attack. The targets may be entirely fictitious hosts that are not in the DNS system. The targets may be entirely fictitious IP addresses used in spoofing or fishing. It is the behavior of the clients in using the IP addresses, URI, or host names of targets that is analyzed.

What is claimed is:

1. A method for operating a customer data collection and protection apparatus which has a processor configured by a software product and a computer-readable local store of categorized targets comprises:
   transmitting to a central server reports on traffic to targets not categorized, wherein targets comprise actual Internet Protocol addresses;
   receiving from the central server an update containing a list of uncategorized targets which are either a source or a destination of traffic patterns which suggest suspicious, malicious, or infectious behavior, wherein a target is an IP address for a real or fictitious host;

presenting end users with at least one warning of possible infection, malicious code, or suspicious behavior and controls for a malware cleanup tool, detecting a system visiting or attempting to connect to at least one suspicious, malicious, and/or infectious target based on the list received from the central server; and observing, measuring, and recording meta data on traffic or attempts to connect to an uncategorized target, wherein meta data includes how many sources per unit time per destination.

2. A method for operation of a central server which has a processor configured by a software product to detect and distribute identifiers of suspicious, infectious, and malicious targets comprises:

receiving from a plurality of web filter apparatus reports on traffic to or attempts to connect with uncategorized targets wherein targets are actual Internet Protocol addresses;

applying by an analysis circuit rules and patterns which determine that traffic patterns suggest suspicious, malicious, or infectious behavior on the part of a sender;

packaging by an update packaging circuit a list of uncategorized targets which are either a source or a destination of traffic patterns which suggest suspicious, malicious, or infectious behavior; and provisioning by an update distribution circuit the plurality of web filter apparatus with an update containing warnings, malware cleanup tools, and said list of uncategorized targets having suspicious, malicious, or infectious behavior.

3. A system comprising;
a network,
attached computer systems, and instructions which when executed cause
a central server to receive reports on uncategorized targets, to analyze traffic to and concerning said uncategorized targets, to distribute updates to
a local store of categorized targets, wherein targets comprise actual Internet Protocol address;
a circuit to report IP application traffic which has as a destination IP addresses which are not found in the local store of categorized targets;
a circuit to receive and store an updated list of suspicious, malicious, or infectious targets, and
a circuit to redirect a request to a target to a link to a warning to the operator of a client apparatus which has requested from or transmitted to one of the suspicious, malicious, or infectious targets on said list;
wherein said central server comprises:
a receiver circuit to receive reports on traffic to targets not categorized, wherein targets comprise actual Internet Protocol addresses;
an analysis circuit to determine that traffic patterns suggest suspicious, malicious, or infectious behavior on the part of a sender;
an update packaging circuit to assemble a list of uncategorized targets which are either a source or a destination of traffic patterns which suggest suspicious, malicious, or infectious behavior, and
an update distribution circuit which transmits to or responds to requests from a plurality of customer data collection and protection apparatuses.

* * * * *